J. S. HARRIS.
CULTIVATOR AND WEEDER.
APPLICATION FILED APR. 24, 1914.

1,134,194.

Patented Apr. 6, 1915.
3 SHEETS—SHEET 1.

Inventor
J. S. HARRIS,

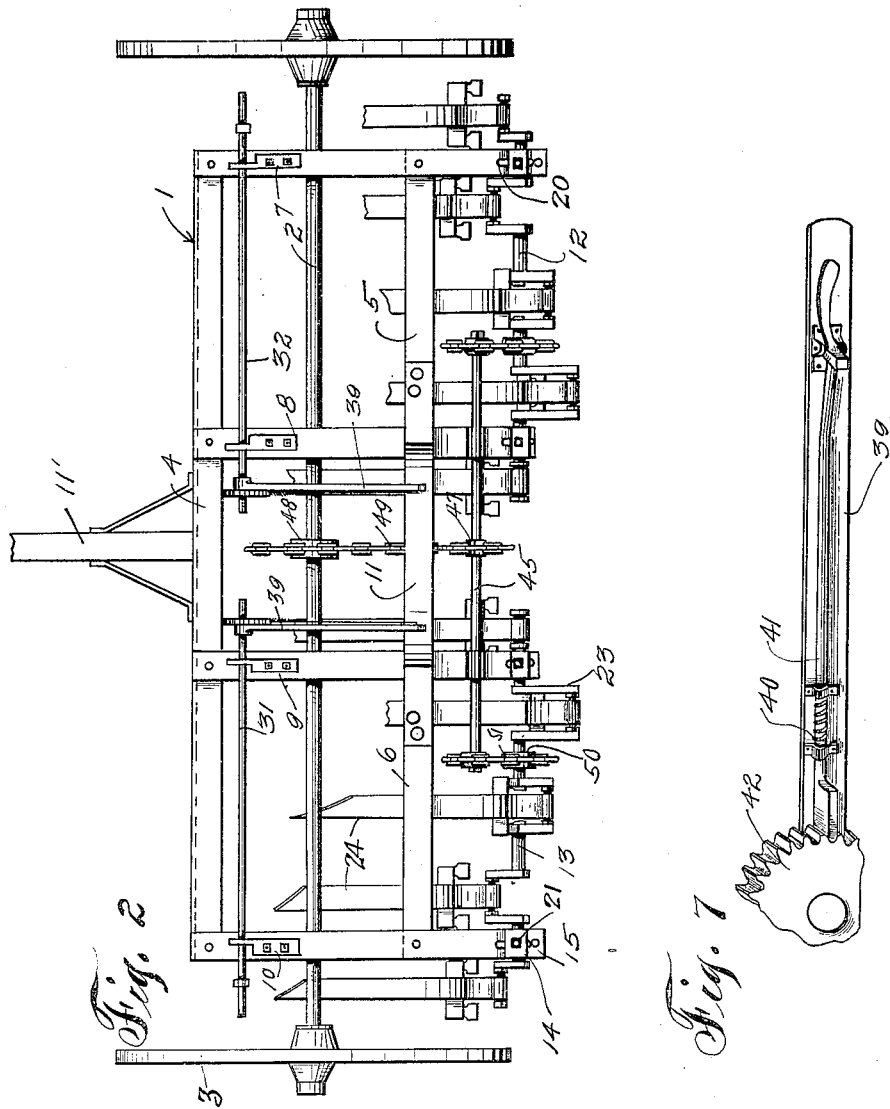

J. S. HARRIS.
CULTIVATOR AND WEEDER.
APPLICATION FILED APR. 24, 1914.
1,134,194.
Patented Apr. 6, 1915.
3 SHEETS—SHEET 3.
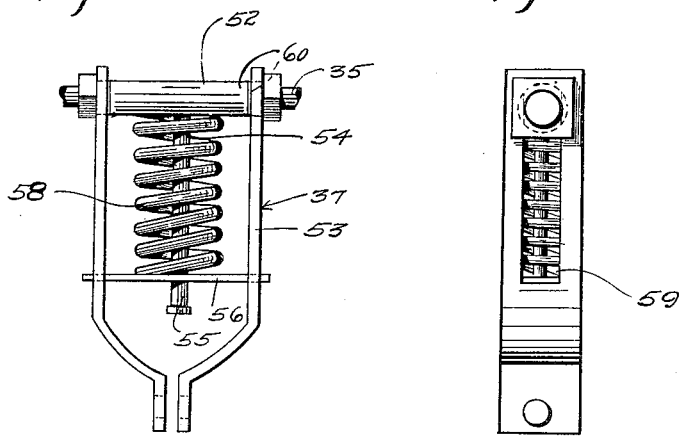
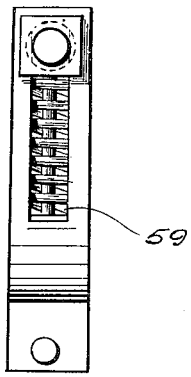
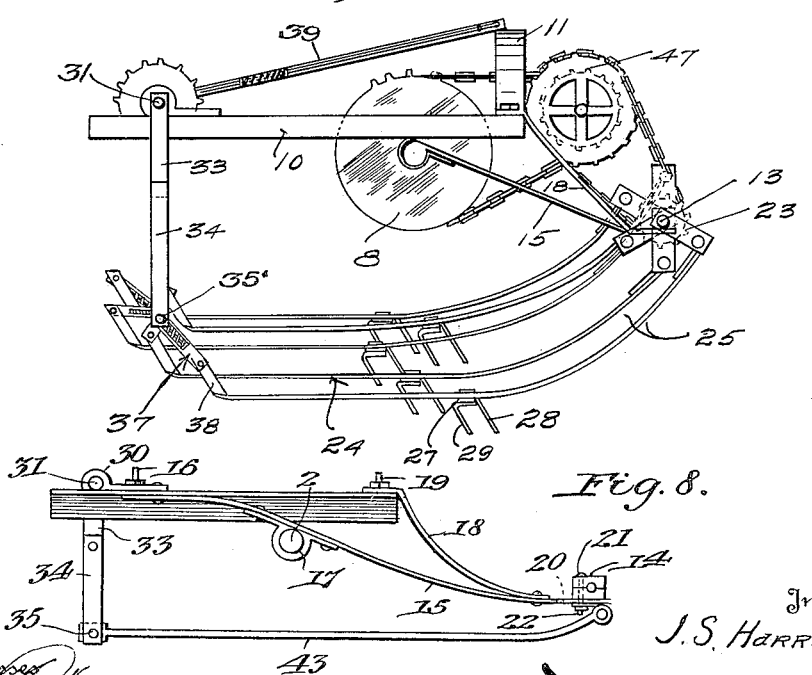

UNITED STATES PATENT OFFICE.

JOHN S. HARRIS, OF GOVAN, WASHINGTON.

CULTIVATOR AND WEEDER.

1,134,194. Specification of Letters Patent. Patented Apr. 6, 1915.

Application filed April 24, 1914. Serial No. 834,225.

*To all whom it may concern:*

Be it known that I, JOHN S. HARRIS, a citizen of the United States, residing at Govan, in the county of Lincoln and State of Washington, have invented certain new and useful Improvements in Cultivators and Weeders, of which the following is a specification.

My invention relates to new and useful improvements in farming implements and resides in the provision of a novelly constructed device which will operate to cultivate and weed ground in a reliable and expeditious manner.

An important object of my invention is to provide a cultivator and weeder of the character described which will not clog or gather roots on the cultivating instrument, or leave ridges or furrows in the ground it has traveled over, will have a tendency to remove weeds without disturbing but a slight portion of the soil in plowed ground, and will cut up stubble in short lengths and mix it with the soil before plowing.

Another important object of my invention is to provide a cultivator or weeder of the character described which consists of a plurality of implements that are arranged to alternately move into engagement with the ground and are operatively connected with the supporting wheels of the frame for the device.

Another important object of my invention is to provide means whereby the ground instruments will yield when coming into contact with rocks or hard ground thus preventing breakage of the instruments and derangement of the operating mechanism.

A still further important object of my invention is to provide means for adjusting the implements, so that they may be raised or lowered with relation to the ground, that is simple and reliable in operation.

Another important object of my invention is to provide a cultivator and weeder of the character described which is simple as to construction, reliable and efficient in operation, capable of being readily and easily assembled and disassembled, and which is cheap to manufacture.

The above and additional objects are accomplished by such means as are illustrated in the accompanying drawings, described in the following specification and then more particularly pointed out as claimed.

Figure 1:
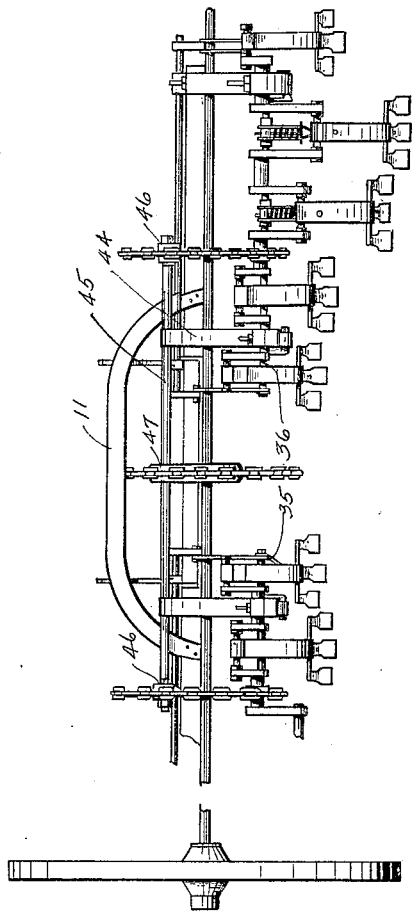
Figure 4:
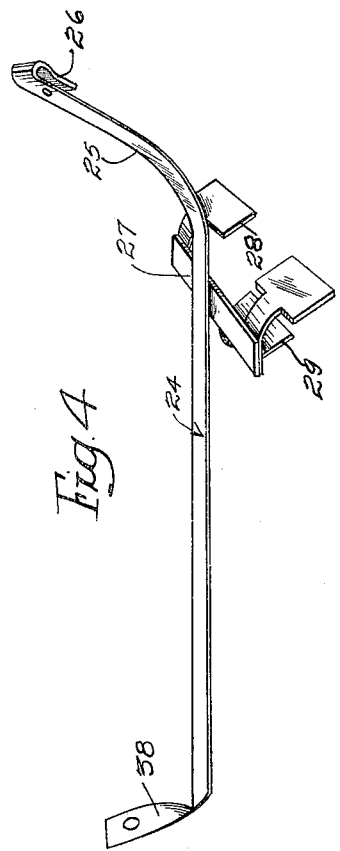

With reference to the drawings, wherein I have illustrated the preferred embodiment of my invention as it is reduced to practice, and throughout the several views of which similar reference numerals designate corresponding parts, Figure 1 is a rear elevation of my improved cultivator and weeder showing the same as it would appear when in assembled position, Fig. 2 is a top plan view with parts omitted and others shown in section for the sake of clearness, Fig. 3 is an end elevation with the wheels removed with certain parts omitted for the sake of clearness, Fig. 4 is a detail perspective view of one of the instrument supporting beams showing the cultivating and weeding instruments attached, Fig. 5 is a detail front elevation of the yielding means for the instrument supporting beams, Fig. 6 is a detail side elevation of the yielding means, Fig. 7 is a fragmentary detail perspective of the adjusting lever showing the lever locking mechanism to coöperate therewith, and Fig. 8 is a side elevation of the frame with the wheels removed.

Referring to the drawings, the numeral 1 designates as an entirety a supporting frame which has journaled longitudinally therethrough a rotatable axle 2 fixed upon the ends of which are supporting wheels 3. The frame 1 consists of a front angle bar 4 that extends the entire length of the frame and is connected with bars 5 and 6 of similar construction and that are disposed in spaced parallel relation to the bar 4 by connecting cross bars 7, 8, 9 and 10. The bars 7 and 10 connect the ends of the bars 5 and 6 with the ends of the bar 4, while the bars 8 and 9 connect the inner ends of the bars 5 and 6 with the intermediate portion of the bar 4. It will be seen that the inner ends of the bars 5 and 6 are spaced from each other as are the bars 7 and 8 thus providing a space in the center of the frame 1 which is for a purpose to be later more fully described.

An upstanding arcuate bar 11 is secured at its ends adjacent the inner ends of the bars 5 and 6 and bridges the space between the inner ends of the bars 5 and 6.

The shaft 2 is journaled in suitable bearings disposed adjacent the under face and centrally of the ends of the bars 7, 8, 9 and 10. The bars comprising the frame 1 are preferably angle iron to provide strength but may be of any suitable construction. Suitable draft gear designated 11' as an entirety is secured intermediate the ends of the forward bar 4 of the frame 1.

Crank shafts 12 and 13 are carried by the frame 1 in a horizontal plane at the rear of the frame. These crank shafts are journaled in adjustable bearings 14 that are mounted in a plurality of supporting bars 15 adjacent the rear end of the bars. The bars 15 are secured by bolts 16 at their forward ends to the bars 7, 8, 9 and 10 adjacent the forward ends of the bars 7, 8, 9 and 10.

Suitable nuts are turned upon the bolts 16. The bars 15 extend downwardly and rearwardly with relation to the frame 1 and carry intermediate their ends bearings 17 for the axles 2. Rearwardly and downwardly extending brace bars 18 are secured at their rear ends adjacent to the rear ends of the bars 17 and their forward ends to the ends of the frame bars 5 and 6 upon the upper side of the frame bars. Bolts 19 are inserted through the frame bars 18 having nuts turned thereon and serve to removably secure the bars 18.

The rear ends of the bars 15 are longitudinally slotted as at 20 and receive bolts 21 that are inserted through the bearings 14 and have suitable nuts 22 turned upon their lower terminals which are threaded. It will be readily seen that the bearings 14 are adjustable and may be held in adjusted position by tightening the nuts 22.

The crank shafts 12 and 13 are similar as to construction and have their crank portions designated 23 disposed at different angles with relation to each other so as to provide for an alternate ground engaging movement with relation to the ground engaging instruments which will be later more fully described.

The crank portions of the crank shaft 12 correspond in position to the crank portions of the crank shaft 13. Loosely mounted upon the crank portions 23 of the cranks 12 and 13 are instrument supporting beams designated 24 as an entirety. The beams 24 are provided with upwardly curved rear ends 25 that are bent over as at 26 to provide bearings for the crank portion 23.

Mounted transversely of the bars 24 adjacent the points where the rear portions begin to curve upwardly as at 25 are instrument securing plates 27. Suitably secured adjacent the ends of the plates 27 are ground engaging instruments or blades 28 that are disposed in a downwardly and rearwardly inclined plane with relation to the vertical axis of the frame and preferably provided with sharpened cutting lower edges. Secured centrally of the ends of the plates 27 are blades 29 similar to the ones 28 in construction and angular disposition but arranged between and forwardly of the ones 28 as clearly shown in Fig. 4 in the drawings. These blades are arranged to engage the ground upon the rotation of the crank shafts and their movement to engage the ground for weeding and cultivating purposes is opposite to that of the line of travel of the machine as will be later more fully described.

Mounted in suitable bearings 30 that are secured upon the bars 7, 8, 9 and 10 by the bolts 16 that are employed for securing the bars 15 are adjusting shafts 31 and 32 that are disposed in parallel relation to the axle 2 upon the upper faces of the bars 7, 8, 9 and 10 and spaced from each other at their inner ends. Downwardly extending arms 33 are fixed upon the ends of the shafts 31 and 32. A plurality of link members 34 are pivoted at their ends to the free ends of the arms 33 and adjacent the ends are supporting bars 35 and 36 that are arranged below and in parallel relation to the shafts 31 and 32. A plurality of link members each designated 37 as an entirety pivotally connect the beams 24 with the bars 35 and 36. In this connection it will be noted that the forward ends of the beams 24 are twisted and bent upwardly and apertured as at 38. The portions 38 are pivoted to the lower ends of the link members 37.

Fixed to the inner ends of the shafts 31 and 32 are levers 39 that are equipped with lever locking mechanism designated 40 as an entirety consisting of a slidable bar 41 coöperating with a spring and a notched or toothed quadrant 42.

It will be readily seen that through the medium of the levers and coöperating parts, the beams 24 with instruments thereon may be raised or lowered with relation to the ground. Upon the movement of the lever 39 in the proper direction, the arms 33 on the shafts 31 and 32 are moved from a normally downwardly extending position, upwardly causing the supporting bars 35 and 36 to be lifted upwardly and subsequently the beams 24.

The supporting bars 35 and 36 are provided with brace rods 43 that are pivoted at their ends at points adjacent the ends of the supporting bars 35 and 36 and to the under faces of the outer ends of the bars 15 as clearly shown in Fig. 8 in the drawings. The rods 43 serve to strengthen the structure generally and in being pivoted permit free adjustment of the supporting bars 35 and 36.

Journaled in a pair of upstanding bearing members 44 that is secured to the rear intermediate the ends of the frame is a horizontal shaft 45 having sprocket wheels 46 at its ends and a sprocket wheel 47 centrally of its ends. The sprocket wheels 46 and 47 are keyed upon the shaft 45. A large sprocket wheel 48 is keyed upon the axle 2 centrally of the ends thereof and disposed in the space comprehended between the frame bars 8 and 9. This sprocket wheel 48 is operatively connected with the one 47 by means of a chain 49. It will be readily seen that upon the rotation of the axle 2 the shaft 45 will be rotated through the medium of the sprocket wheels 47, 48 and chain 49. Sprocket wheels 50 are keyed upon the crank shafts 12 and 13 and are operatively connected with the sprocket wheels 46 on the shaft 45 by means of chains 51.

It will be readily seen that when the device is drawn across a field the wheels serve to rotate the axle 2 which through the medium of the gearing described imparts a rotary movement to the crank shafts 12 and 13 resulting in the forward and rearward movement of the beams 24. When the beams 24 after moving forwardly begin their return movement the instruments 28 and 29 dig into the ground according to the position of the beams and serve to cultivate the ground or cut or remove weeds therefrom.

As a means for preventing breaking of the instruments 28 and 29 should they engage rocks or hard surface I have provided means operating in connection with the link members 37 and illustrated particularly in Figs. 5 and 6 in the drawings which will permit the beams 24 and instruments to yield readily and in a reliable manner. The means mentioned comprises a sleeve or collar 52 that is loosely mounted upon the supporting bars 35 and 36 between the arms 53 which comprise the link members 37. The sleeves 52 have rigidly secured thereto and extending right angularly therefrom arms 54 having enlarged lower ends 55. Plates 56 are slidable upon the arms 54. Spiral expansion springs 58 are mounted upon the arms 54 and engage at their terminals the collars 52 and plates 56. The plates 56 are suitably secured to the arms 53 of the link members 37. The arms 53 are provided with longitudinal slots 59 to slidably receive the bars 35 and 36. These arms 53 slide upon flattened extensions 60 formed on opposite sides of the collars or sleeves 52 and are thus properly guided in sliding with relation to the bars 35 and 36. It will be readily seen that when the instruments 28 and 29 encounter a rock, obstructions or hard surfaces, the springs 58 will yield allowing the link members 37 to slide relatively to the bars 35 and 36 thus provide a yielding action sufficient to prevent breakage of the instruments or derangement of the mechanism. This is considered one of the most essential points of my invention. A suitable driver's seat not shown, is placed upon the top of the frame and is preferably arranged adjacent to the adjusting levers 39.

It will be noted that certain parts of the frame are adjustable and that the entire device may be readily assembled and disassembled. The beams in moving in a rearward direction through the medium of the crank shafts causing the instruments 28 and 29 to be forced into quick engagement with the ground thus serving to weed the ground and cultivate it in a reliable and expeditious manner.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of constructon, proportion and arrangement of parts may be resorted to, when required, without sacrificing any of the advantages of my invention, as set forth.

What is claimed is:—

1. In a device of the character described, a frame, crank shafts journaled in said frame, supporting bars journaled in said frame, means to rotate said crank shafts, instrument supporting beams pivotally connected at their ends to said crank shafts and supporting bars, a plate secured intermediate of its ends transversely of each of said instrument supporting beams, an instrument secured at each end of said plates and extending rearwardly thereof and an instrument secured adjacent the central portion of each of said plates and arranged in advance of said first named instruments.

2. In a device of the character described, a frame, a plurality of instrument supporting beams operatively mounted in said frame, means to move said beams back and forth, bars mounted in said frame, link members pivotally connecting certain ends of said beams with said bars, a ground engaging instrument carried by each of said beams, said links having longitudinal slots therein to receive said bars, arms loosely mounted on said bars, expansion springs mounted on said arms, and plates secured to said links engaging certain ends of said springs and slidable upon said arms.

3. In a device of the character described, a frame, crank shafts mounted in said frame, means to rotate said crank shafts, bars mounted in said frame, a plurality of instrument supporting beams pivotally connected at certain of their ends to said crank shafts, a ground engaging instrument carried by each of said beams, substantially upright link members pivotally connecting said beams with said bars, said link members being provided with longitudinal slots to receive said bars, and means operatively connected with said bars and link members to permit yielding of said beams upon engagement of said ground engaging members with rocks or hard surfaces.

4. In a cultivator and weeder, a frame, wheels supporting the frame, a plurality of instrument supporting bars mounted within the frame, a ground engaging instrument carried by each of said bars, means to move the instrument supporting bars back and forth so that the instruments thereon are moved toward the ground when said bars are traveling in a direction opposite to the direction of travel of the frame, said means being operatively connected with the wheels of the frame, link members connecting certain ends of the beams with the frame, arms loosely mounted on said frame, expansion springs mounted on said arms, and plates secured to said link members, engaging certain ends of said spring and slidable upon said arms.

In testimony whereof I affix my signature in presence of two witnesses.

JOHN S. HARRIS.

Witnesses:
JULIUS C. JOHNSON,
DAN WILLIAMS.

Copies of this patent may be obtained for five cents each, by addressing the "Commissioner of Patents, Washington, D. C."